Jan. 5, 1932.  E. DRUPPEL  1,839,380
MACHINE FOR REAPING PAPYRUS
Filed May 23, 1927  3 Sheets-Sheet 1
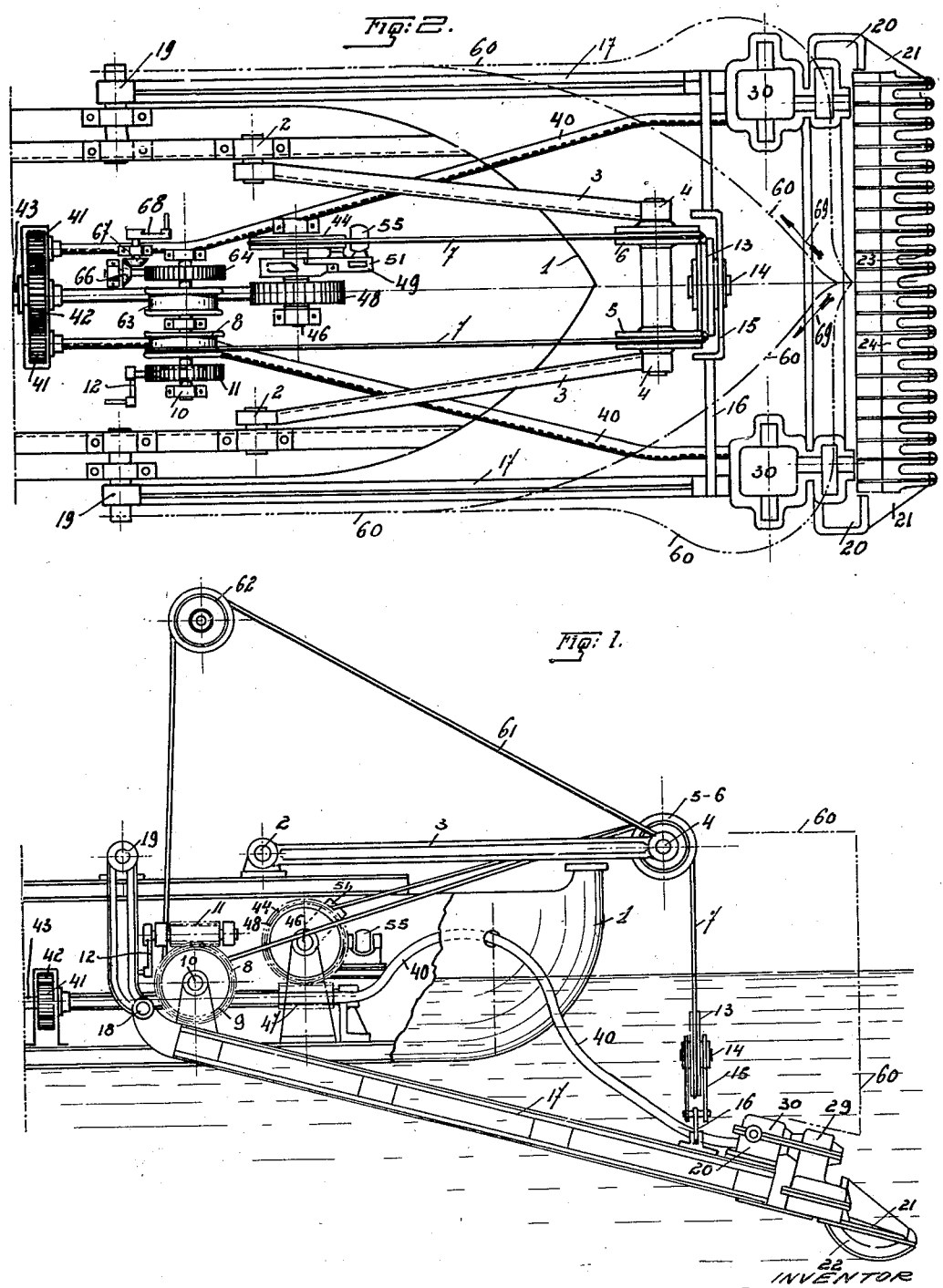

Jan. 5, 1932.  E. DRUPPEL  1,839,380
MACHINE FOR REAPING PAPYRUS
Filed May 23, 1927   3 Sheets-Sheet 2
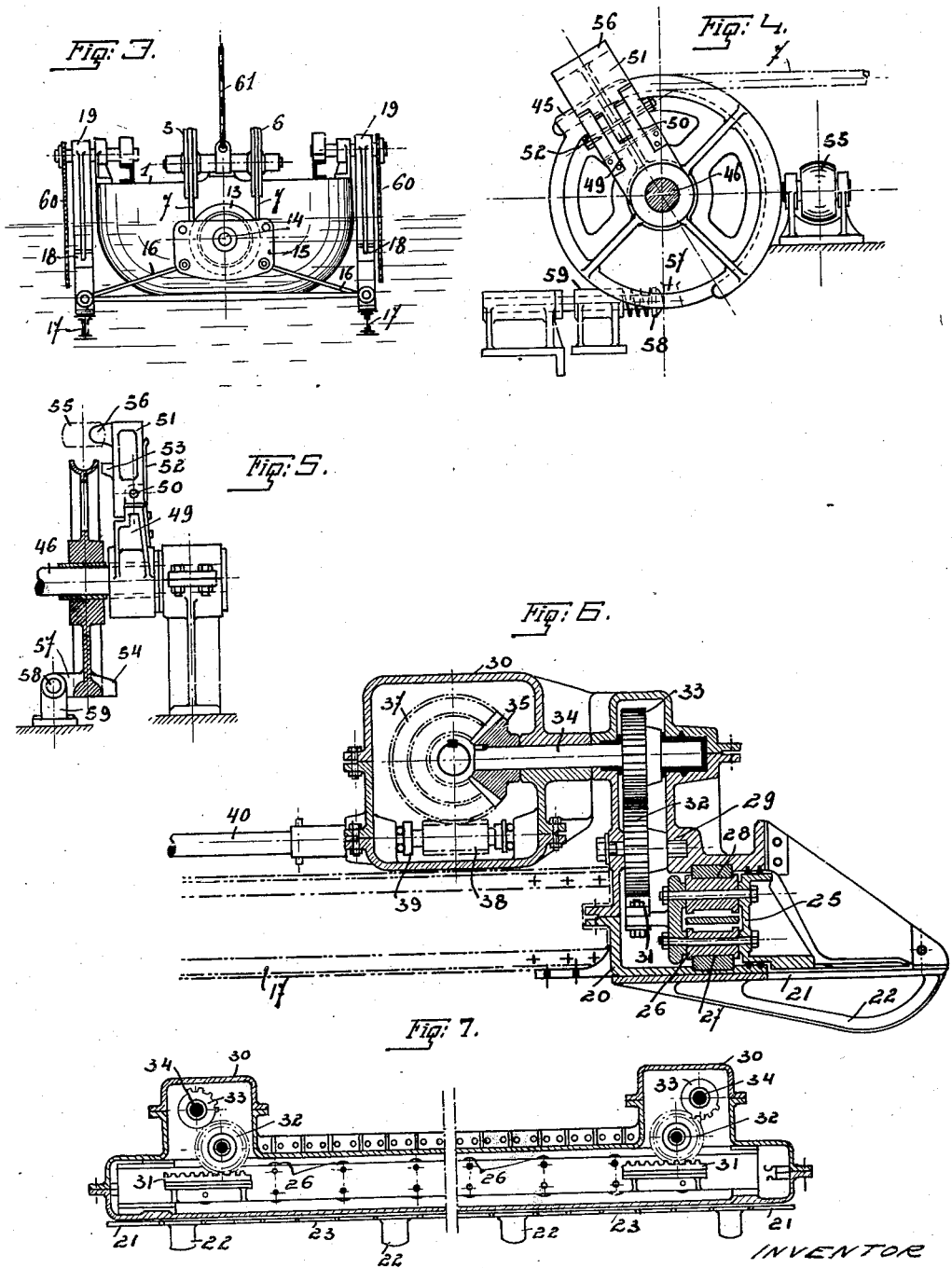

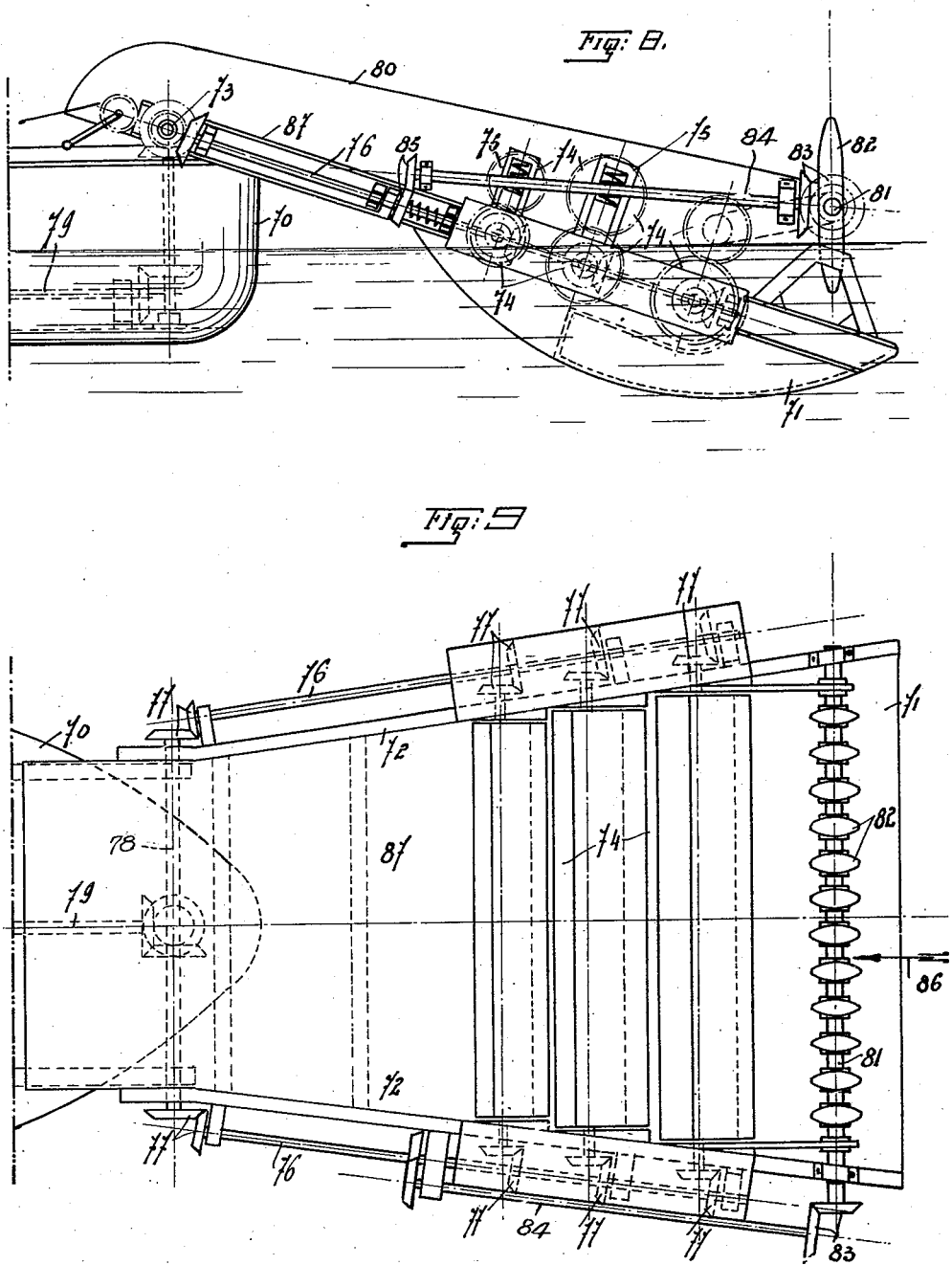

Patented Jan. 5, 1932

1,839,380

UNITED STATES PATENT OFFICE

EDOUARD DRUPPEL, OF BRUSSELS, BELGIUM, ASSIGNOR OF FIFTY PER CENT TO COMPTOIR BELGE DE COMMERCE ET D'INDUSTRIE, SOCIÉTÉ ANONYME, OF BRUSSELS, BELGIUM

MACHINE FOR REAPING PAPYRUS

Application filed May 23, 1927, Serial No. 193,671, and in Belgium May 28, 1926.

This invention relates to reaping machines and has for its object a reaping machine for reaping papyrus and other similar reeds.

According to this invention I provide a machine adapted to cause the penetration of a cutting device between the papyrus stalks and their cutting under water, as a transporting device, such as a boat, for instance carrying the machine, is propelled along, this cutting action being completed when desired by a vertical displacement of the cutter, intended to perform the separation of the severed stalks, which are allowed to float downstream, alongside of the said transporting device, and are gathered either on the said transporting device or on a barge which may be towed by the transporting device carrying the cutter. The cutter is constituted by a fixed member provided with cutting teeth or blades, against which a movable member, also provided with cutting teeth or blades, is adapted to move with a reciprocating motion. In order to completely sever the stalks after they are cut, the whole of the cutter is supported by a lifting apparatus allowing it to be raised through a certain distance after each operation of the cutter so as to perform by means of the metallic blades a combing like action along a certain length of the stalks after which the whole of the cutter falls back to its lowest position ready for a fresh cutting operation.

In practice the cutting apparatus is constituted by a supporting frame hinged to the transporting device and supported by a cable; the said frame carrying the fixed cutting blade forms a guide on which is adapted to move a rod mounted on rollers and carrying the movable cutting blade said rod being given a reciprocating motion by means of a transmiting mechanism with rack and pinion operated by means of flexible shafting driven by the motor propelling the transporting device.

The raising and lowering of the cutter is obtained by the partial winding of the cable supporting the frame on a pulley carried by a rotating arm mounted on a revolving shaft, this arm being provided with a hinged member provided with a stop which may be deflected by the action of a roller after effecting the required displacement so as to cause the return of the winding pulley to its original position, in which it comes to press against a spring-stop.

A device constituted by sheet iron pieces suitably shaped and assembled are adjustably fixed to the transporting device, so as to constitute a penetrating member adapted to free the severed stalks, either on one side or the other or on both sides of the transporting device, for the purpose of facilitating the conveyance of the stalks to the gathering apparatus.

Referring to the drawings left herewith, which illustrate as an example one particular manner of carrying out the invention.

Fig. 1 is a side elevation, partly in section, of a boat provided with the penetrating member and cutting device;

Fig. 2 is a plan of the same device and Fig. 3 is a front elevation, the cutter being removed;

Fig. 4 is a detail view, on a larger scale, showing, in side elevation, the driving arrangement causing the movement for raising and lowering the cutter;

Fig. 5 is a view, partially in section, showing more specially the arm for the driving and the release of the pulley for the winding of the cable.

Fig. 6 is a section, on a larger scale, of the mechanism operating the cutter, of which Fig. 7 is a front elevation;

Figs. 8 and 9 are a side elevation and a plan, respectively of a gathering mechanism separate from the cutting mechanism.

In the example shown, 1 is a boat provided with any suitable means of propulsion. On this boat are mounted, on bearings 2, arms 3 supporting a shaft 4 on which are mounted two pulleys 5, 6 on which passes a cable 7 one end of which is wound on the drum 8 of a winch adapted to be rotated by hand by means of a gear which, in the example shown, comprises a worm wheel 9 mounted on the axle 10 of the drum 8 and actuated by a worm 11 operated by means of a handle 12. Between the two pulleys 5, 6 the cable 7 passes round a pulley 13, the axle 14 of which is mounted in a casing 15 connected by rods 16 to two arms 17 pivoted at 18 on two other arms pivoting at their further ends on pins 19 fixed on the upper portion of the boat. These arms are rigidly secured together with a frame 20 carrying the cutting mechanism properly so called. This frame 20 carries at its lower portion a blade 21 provided with several skates 22. The blade 21 is shaped in such a manner as to have a series of teeth or cutters 23 with bevelled edges on which is adapted to move a blade 24, of corresponding shape, rigidly fixed to a guiding rod 25 carrying series of rollers 26 adapted to roll between bearing surfaces 27, 28, carried on the one hand by the frame 20 and on the other hand by a cover 29 which constitutes at the same time a water-tight casing for the driving mechanism, which is also contained in a water tight box 30, mounted on each of the arms 17. In order to obtain a reciprocating motion of the movable part 24 of the cutter, the guiding rod 25 is provided at the rear, at each end, with a short rack 31. Each of these racks is engaged by a free pinion 32 adapted to receive a movement of partial rotation from a pinion 33 which is provided with teeth along a portion of its periphery only and is mounted on an axle 34 rotating in the box 30 and in the casing 29. Each of the axles 34 situated at one of the extremities of the frame 20, carries a bevel pinion 36 gearing with a helicoidal wheel 37 playing the part of speed reduction gear and which receives its motion from a worm 38 mounted on a shaft 39 driven by a flexible transmission 40. As shown in Figs. 1 and 2, the flexible transmissions 40 are driven in the boat 1 by gears 41 actuated by gearings 42 mounted on the shaft of a motor disposed in the axis of the boat.

As it has already been stated, one of the ends of the cable 7 supporting by means of a pulley 13 the whole of the frame 20 and of the arms 17 mentioned above, is wound on the drum 8 of a winch. The other end of this cable passes, as shown in Figure 4, on a pulley 44 on which it is fixed by a conical grip 45. This pulley is loose on a shaft 46 which is driven by the shaft 43 by means of a worm 47 driving a wheel 48 with helicoidal teeth, keyed on the shaft 46 and acting also as a speed reducing gear. On the shaft 43 is also keyed an arm 49 carrying a pivot 50 on which can rotate an arm 51 manitained in its normal position by a spring 52. This arm 51 is provided laterally with a stop 53 adapted to meet, when the shaft 46 rotates, a stop 54 placed on the side of the pulley 44. On the other hand, at a suitable position with respect to the plane of rotation of the pulley 44, is located a roller 55 against which butts at a given instant, after one third of a revolution, during the rotation of the pulley 44, a second projection 56 carried by the pivoted arm 51, so that at that instant this portion 51 of the arm 46 can be deflected laterally and the stop 53 can miss the stop 54 so as to release the pulley 44. The latter pulley, under the action of the weight of the apparatus which it supports, rotates then in the opposite direction until it is stopped by a lateral projection 57 meeting a spring stop 58 mounted on the supports 59. The meeting of the stop 57 with the stop 58 limits therefore the return of the pulley 44 and brings back the frame 20 to its original position in depth.

The front part of the boat 1 is completed by a prow member 60 forming a kind of shield constituted by sheet-iron pieces suitably curved surrounding the front portion of the boat and adapted to oscillate on supports suitably mounted on the sides of the boat, for example, on the pin 19. This prow member is itself maintained at the desired height by flotation, that is to say its acute-angled portion is provided with a water tight chamber of a sufficient size to support the weight of the prow member and maintain it at a constant height with respect to the level of the water.

The raising of the prow member out of the water takes place when the frame formed by the arm 3 and the shaft 4 is itself lifted. To this end a suspension cable 61 is secured to the shaft 4 and passes over a pulley 62 disposed on the upper portion of the boat and its internal extremity is wound on the drum 63 of a winch which, in this manner, enables the whole frame of the cutter to be lifted outside of the water.

The raising of this frame causes that of the prow member in the case when the boat is to be freely displaced to a distance without operating as a reaping apparatus.

The drum of the winch 63 is itself adapted to be rotated by means of a wheel with helicoidal teeth 64 receiving its movement from a worm 65 itself driven by bevel pinions 66 one of which is mounted on an axle 67 which can be rotated manually by a handle 68. The curvature of the iron-sheets of this prow member 60 is determined either as is shown in broken lines of Fig. 3, so as to produce a rejection on both sides of the severed stalks, with respect to the longitudinal axis of the boat in the direction of the arrows 69, or if desired so as to produce this deflection only on one side or the other of the said axis.

The apparatus above described functions in the following manner:

The boat 1 advancing under the action of its propelling apparatus, enters among the papyrus with the prow member 60. At that moment the position of the frame 20 with respect to the depth is regulated in such a manner that the fixed portion of the frame and of the cutter are under water at a required depth variable or adjustable at will by the action of the handle 12. When at work, the flexible shaft transmission 40 causes the partially toothed pinions 33 contained in the casing 29 to rotate. One of these pinions engaging by means of its toothed portion the gear wheel 32, actuates by the latter the rack 31 in such a manner that the movable guiding rod 25 moves between the rolling surfaces 27 and 28, driving in this manner the movable blade 24, which slides on the fixed blade 21 and cuts the stalks engaged between the cutters 23 of the fixed portion of the cutting device. At the end of this cutting operation the pinion 33 mentioned above has turned by such an extent that its toothed portion becomes disengaged from the toothed wheel 32 with which it was in gear, so that the movable portion of the cutting device comes to rest. At this moment, owing to the continuous rotation of the shaft 46, the arm 49 comes in contact with the stop 54 of the pulley 44 and drives the latter round. When this pulley has performed one third of a revolution and has, for instance, lifted the whole of the cutting device through a certain height owing to the shortening of the cable 7 passing under the pulley 13, the stop 56 of the pivoted arm 51 comes in contact with the roller 55. The arm 51, pivoted on the projection 49 keyed to the shaft 46 being in this manner disengaged from the stop 54, the pulley 44 turns back by one third of a revolution while the arm 51 continues its movement of rotation with the shaft 46. At this moment, the pulley 44 permits therefore the frame 30 to fall back through a height corresponding to that through which this frame has been lifted, the frame descending until the moment when the stop 57 butts against the spring buffer 58. At this moment, the cutting device having resumed its normal position, the flexible shaft 40 driving the second partially toothed pinion 33 causes, by the starting of the toothed wheel 32 and of the rack 31, a movement in the reverse direction of the movable parts 24 of the cutting device which performs in this manner a new shearing of the stalks which have become engaged between the cutters of the fixed portion 21 of the cutting device. It will be noticed that, consequently, each period of the working comprises, besides the penetration of the cutter between the reeds a first cutting operation resulting from the displacement of the movable part 24 of the cutter in one direction and then a lifting of the cutting device followed by a return to its original depth and finally a new movement of the movable blade in the reversed direction. Between the two cutting strokes of the cutting device, the latter therefore slides along the stalks, performing their separation if they are entangled and completing the action of the cutter by pulling them apart. The stalks reaped in this manner fall in the water and are deflected by the prow member 60 laterally with respect to the boat 1, in the direction of the arrows 69 and are brought back on the water along the sides of the boat as the latter advances. These stalks can then be gathered, either directly on the boat itself or in a separate barge which may be towed by the boat or may simply follow the boat carrying the reaping device properly so called.

A suitable arrangement for separately gathering the stalks which have been cut down as described above is illustrated, as an example, in the Figs. 8 and 9. In these figures 70 is the barge intended for gathering the cut stalks. At the front of this barge is mounted a kind of large spade of thick sheet iron, and tapering in shape; under the wider portion of this spade, which is the portion furthest from the barge, is situated a watertight chamber 71 carrying, on supports 72 which are pivoted at 73 on the front part of the barge, a series of rolls 74 coupled in pairs and pressed against each other by means of springs 75. These rolls are put in rotation by shafts 76 driven by means of bevel gearings 77 through a shaft 78 driven in its turn by a shaft 79 driven by a suitable motor.

In front of the spade and between the edges 80 of the whole of the frame carrying the rolls 74 is mounted a shaft 81 carrying paddles 82. The shaft 81 is driven by pinions 83, one of which is mounted on a shaft 84 driven by means of the shaft 76 through gearings 85. Owing to this arrangement, and through the action of the rotation of the paddles 82, the stalks brought in the direction of the arrow 86 along the stream are disentangled and their position is rectified lengthwise as soon as they are caught by the first pair of rolls; they are then carried further on between the following pairs of rolls and conveyed in this manner on the incline 87 constituted by the bottom of the spade 80 which is securely fixed to the floating chamber 71.

The invention is not limited to the details of construction of the apparatus here illustrated and described as an example, a great number of these details being susceptible of being modified widely according to the dimensions of the apparatus or of the particular application in view. For instance, the reaping mechanism is not necessarily mounted on a movable device constituted by a boat. In some cases, particularly when reaping a shallow swamp, or when the work can be performed from the bank of a stream, the whole of the mechanism may be mounted on any other suitable vehicle. Similarly the gathering mechanism may, in certain cases, be directly combined with the reaping mechanism.

What I claim is:

1. In a machine of the kind described, a transporting device, a frame pivoted on the said transporting device, a cutting device carried by the said frame, the said cutting device comprising a fixed blade provided with cutters and a movable blade also provided with cutters and cooperating with the fixed blade, a guiding rod supporting the movable blade, bearing surfaces on the pivoted frame, a cover for the said frame, bearing surfaces on the said cover, rollers carried by the guiding rod, the said rollers being guided between the said bearing surfaces of the pivoted frame and of the cover, racks on the guiding rod, pinions cooperating with the said racks and a flexible transmission actuating the said pinions, means whereby the pivoted frame is lifted and lowered between two consecutive cutting strokes of the movable blade, and a prow whereby the stalks severed by the cutting device are deflected laterally.

2. In a machine of the kind described, a transporting device, a supporting frame hinged to the transporting device, a cable supporting the said frame, a fixed cutting blade mounted on the said frame, a guide on the said fixed cutting blade, a rod, rollers carried by the said rod and through which the rod is guided on the fixed cutting blade, a transmitting mechanism with rack and pinion mounted on the supporting frame whereby the rod is given a reciprocating motion, a movable cutting blade fixed to the said rod, a motor propelling the transporting device, a flexible shaft between the said motor and the transmitting mechanism mounted on the supporting frame, means for winding and unwinding partially the cable supporting the frame whereby the said frame is raised and lowered, and a prow whereby the stalks severed by the cooperation of the fixed and of the movable cutting blades are deflected laterally.

3. In a machine of the kind described, a transporting device, a supporting frame hinged to the transporting device, a cable attached at one end to the said supporting frame, a pulley on which this cable is fixed at the other end, a lateral stop on the said pulley, a pivoted arm, a stop provided on the said arm means for giving a rotating movement to the said arm, whereby the cable is wound partially on the pulley, and the frame is given a raising motion, a releasing roller cooperating with the pivoted arm, whereby the pulley is released after a partial rotation and the frame is permitted to fall back after each raising motion, a fixed cutting blade mounted on the supporting frame, a guide on the said fixed cutting blade, a rod, rollers carried by the said rod and through which the same is guided on the fixed cutting blade, a transmitting mechanism with rack and pinion mounted on the supporting frame, whereby the rod is given a reciprocating motion, a movable cutting blade fixed to the said rod, a motor mounted on the transporting device, a flexible shaft between the said motor and the transmitting mechanism mounted on the supporting frame and a prow whereby the stalks severed by the cooperation of the fixed and of the movable cutting blades are deflected laterally.

4. In an apparatus for harvesting seaweed and the like, a transporting device, cutters carried by and mounted for swinging movement with respect to the transporting device, means for imparting operative movement to the cutters, and means for raising and lowering the cutters between two successive cutting strokes thereof, said raising movement serving to dislodge the severed material and elevate it.

5. In a machine for harvesting seaweed and the like, a transporting device, material cutters carried by and supported for swinging movement in advance of the device, means for operating the cutters, and means for automatically raising and lowering the cutters intermediate two successive cutting strokes thereof.

6. In a machine for harvesting seaweed and the like, a transporting device, cutters carried by and mounted for swinging movement in advance of the device, means for operating the cutters for a cutting operation, manual means for moving the cutters, manually operable means for positioning the cutters at a required depth of operation, and means for automatically raising and lowering the cutters with respect to said operating depth intermediate two successive cutting strokes of the cutters.

7. In a machine for harvesting seaweed and the like, a transporting device, a frame mounted for swinging movement on the device, and cutters carried by the frame in advance of the device, means for actuating the cutters for a cutting operation, manually operable means for adjusting the frame to determine the cutting depth of the cutters, and means for automatically raising the frame to a position above and then lowering it to a position in accordance with the predetermined cutting position, said automatic means operating intermediate two successive cutting strokes of the cutters.

8. In a machine of the kind described, a transporting device, supporting members for a cutting device, the said members being pivoted on the said transporting device, and the said cutting device comprising a fixed blade provided with cutters and a movable blade also provided with cutters and adapted to be reciprocated on the fixed blade, means for lifting and lowering the supporting means together with the cutting device between two consecutive cutting strokes of the movable blade, whereby the stalks to be cut are combed, and means whereby the stalks which have been severed are deflected laterally.

In testimony whereof I have affixed my signature.

EDOUARD DRUPPEL.